US011639828B2

(12) United States Patent
Wright et al.

(10) Patent No.: US 11,639,828 B2
(45) Date of Patent: May 2, 2023

(54) HEAT EXCHANGER

(71) Applicant: Turbine Aeronautics IP Pty Ltd, Mile End South (AU)

(72) Inventors: Alex Wright, Adelaide (AU); Ali Mahallati, Ottawa (CA)

(73) Assignee: Turbine Aeronautics IP Pty Ltd, Mile End South (AU)

( * ) Notice: Subject to any disclaimer, the term of this patent is extended or adjusted under 35 U.S.C. 154(b) by 16 days.

(21) Appl. No.: 17/356,212

(22) Filed: Jun. 23, 2021

(65) Prior Publication Data

US 2022/0003165 A1 Jan. 6, 2022

(30) Foreign Application Priority Data

Jun. 25, 2020 (AU) ................................ 2020902126

(51) Int. Cl.
*F28D 21/00* (2006.01)
*F28D 7/00* (2006.01)
*F28F 1/40* (2006.01)

(52) U.S. Cl.
CPC ......... *F28D 21/001* (2013.01); *F28D 7/0025* (2013.01); *F28F 1/40* (2013.01); *F28D 21/0003* (2013.01); *F28F 2250/00* (2013.01)

(58) Field of Classification Search
CPC ........ F28D 7/0025; F28D 9/0037; F28D 9/02; F28D 9/0031; F28D 9/0062; F28D 7/0041; F28D 7/0008; F28F 1/40; F28F 2250/00; F28F 2225/04; F28F 3/086; F28F 3/12; F28F 1/422; F28F 7/02; F28F 3/14

USPC ........................................................ 165/185
See application file for complete search history.

(56) References Cited

U.S. PATENT DOCUMENTS

| | | | | | |
|---|---|---|---|---|---|
| 2,892,618 | A | * | 6/1959 | Holm | F28F 3/022 165/185 |
| 3,320,749 | A | * | 5/1967 | Castle | F02K 3/115 60/39.511 |
| 3,831,374 | A | * | 8/1974 | Nicita | F28D 9/0018 165/166 |
| 4,729,428 | A | * | 3/1988 | Yasutake | F28F 13/12 165/166 |
| 5,497,615 | A | | 3/1996 | Noe et al. | |
| 5,845,399 | A | * | 12/1998 | Dewar | F28D 9/0062 165/DIG. 356 |

(Continued)

*Primary Examiner* — Jon T. Schermerhorn, Jr.
(74) *Attorney, Agent, or Firm* — Avek IP, LLC; Kent R. Erickson

(57) ABSTRACT

A heat exchanger for a gas turbine engine comprising a compressor, a combustor and a turbine. The heat exchanger comprising alternating hot and cold channels. Compressed air from the compressor flows through the cold channels and exhaust gas from the turbine flows through the hot channels. Each cold channel comprises first and second opposing surfaces conveying compressed air along a first path. Each cold channel comprises rows of vortex generators and pin fins extending from the first or second surfaces along the first path. The rows extend substantially perpendicular to the first path. Each hot channel is defined by a first and second opposing surfaces conveying exhaust gas along a second path substantially perpendicular to the first path. Each hot channel comprises rows of vortex generators and pin fins extending from the first or second surfaces along the second path. The rows extend substantially perpendicularly to the second path.

22 Claims, 6 Drawing Sheets

(56) References Cited

U.S. PATENT DOCUMENTS

| | | | | |
|---|---|---|---|---|
| 6,032,459 A * | 3/2000 | Skowronski | ............ | F01D 15/10 60/262 |
| 6,263,955 B1 * | 7/2001 | Azar | ........................ | F28F 3/02 174/16.3 |
| 6,438,936 B1 * | 8/2002 | Ryan | .................... | F28D 9/0018 165/166 |
| 6,578,627 B1 * | 6/2003 | Liu | ........................ | F28F 13/12 165/151 |
| 6,634,176 B2 | 10/2003 | Rouse et al. | | |
| 6,935,418 B1 * | 8/2005 | Valaszkai | ................ | F28F 3/044 165/177 |
| 6,951,110 B2 * | 10/2005 | Kang | .................... | F28D 9/0018 165/4 |
| 7,055,586 B2 * | 6/2006 | Sakakibara | ............... | F28F 3/02 165/158 |
| 7,246,437 B2 * | 7/2007 | Damsohn | .................. | F28F 9/00 165/158 |
| 7,347,254 B2 | 3/2008 | Pantow et al. | | |
| 7,810,552 B2 * | 10/2010 | Slaughter | ................ | F28F 13/06 430/269 |
| 7,961,462 B2 * | 6/2011 | Hernon | .................... | F28F 13/12 361/694 |
| 9,163,884 B2 | 10/2015 | Hwang et al. | | |
| 9,394,828 B2 * | 7/2016 | Eleftheriou | ........... | F28D 21/001 |
| 9,395,122 B2 * | 7/2016 | Eleftheriou | ............. | F28F 13/08 |
| 9,453,687 B2 * | 9/2016 | Kwon | ........................ | F28B 1/06 |
| 9,599,410 B2 * | 3/2017 | Antel, Jr. | ................. | B23P 15/26 |
| 9,724,746 B2 * | 8/2017 | Eleftheriou | ............ | B21D 53/04 |
| 9,766,019 B2 * | 9/2017 | Eleftheriou | ............. | F02C 7/143 |
| 9,851,159 B2 * | 12/2017 | Cameron | ............. | F28D 9/0031 |
| 10,233,838 B2 | 3/2019 | Vick | | |
| 10,801,790 B2 * | 10/2020 | Streeter | .................... | F28F 19/00 |
| 10,823,511 B2 * | 11/2020 | Vargas | ...................... | F28F 1/42 |
| 10,830,540 B2 * | 11/2020 | Sennoun | ................... | B33Y 80/00 |
| 11,306,979 B2 * | 4/2022 | Yun | .......................... | F28F 1/422 |
| 11,333,447 B2 * | 5/2022 | Yun | .......................... | F28F 3/025 |
| 11,352,954 B2 * | 6/2022 | Macchia | ................... | F02C 7/18 |
| 11,391,523 B2 * | 7/2022 | Stillman | .................... | F28F 1/422 |
| 2007/0023174 A1 * | 2/2007 | Brost | .......................... | F28F 9/001 165/DIG. 373 |
| 2009/0321046 A1 * | 12/2009 | Hernon | ................... | F28F 13/02 165/80.3 |
| 2010/0302730 A1 | 12/2010 | Hernon | | |
| 2011/0017436 A1 * | 1/2011 | Cho | ........................ | F28F 9/005 165/166 |
| 2014/0116664 A1 * | 5/2014 | Landre | .................... | F28F 3/025 165/166 |
| 2014/0151012 A1 * | 6/2014 | Salamon | .................... | F28F 13/12 165/185 |
| 2017/0089643 A1 * | 3/2017 | Arafat | ....................... | F28F 7/02 |
| 2017/0146305 A1 * | 5/2017 | Kuczek | ................... | F28F 9/0268 |
| 2017/0356696 A1 * | 12/2017 | Zaffetti | ..................... | F28F 7/02 |
| 2018/0292146 A1 * | 10/2018 | Furrer | ..................... | F28F 3/048 |
| 2019/0277576 A1 * | 9/2019 | Toubiana | ................. | B22F 10/20 |
| 2021/0148657 A1 | 5/2021 | Joardar | | |
| 2021/0163124 A1 * | 6/2021 | Pisani | ..................... | B64C 27/04 |
| 2022/0282931 A1 * | 9/2022 | Lewandowski | ......... | F28F 3/022 |

* cited by examiner

HEAT EXCHANGER

CROSS-REFERENCE TO RELATED APPLICATIONS

This application claims the benefit of Australian Patent Application No. AU 2020902126, filed Jun. 25, 2020, the disclosure of which is hereby incorporated herein in its entirety by reference.

FIELD OF HTE INVENTION

The present invention relates to a heat exchanger. In a particular form the present invention relates to a heat exchanger for a gas turbine engine.

BACKGROUND

Demand for small-scale, low power output power plants and propulsion engines is increasing. Compact, lightweight, low-maintenance, low-noise, low-emissions, and multi-fuel capable gas turbines generally offer superiority over internal combustion engines. However, small gas turbine engines have not been able to compete with internal combustion engines at low power output because of higher fuel consumption. The fundamental technical barrier to developing more fuel-efficient gas turbine engines under 550 hp (400 kW) is scaling the established technology from larger gas turbine engines. The same problem exists for small turbofan engines below 1500 lbf (6.6 kN) thrust. Reducing the scale of larger engine geometries results in performance penalties for several reasons: greater rotational speeds increase friction and mechanical losses; proportionally larger gaps between rotating and stationary components, because of manufacturing tolerances, increased aerodynamic losses; lower operating pressures and temperatures reduce thermodynamic cycle efficiency.

The heat loss from the compressor and combustor increases as the engine gets smaller and the surface area to volume ratio increases. This effect could be used to offset the mechanical and aerodynamic losses by improving the overall thermodynamic cycle efficiency of a small engine. A recuperator, a type of heat exchanger that recovers heat from the engine exhaust gas to increase the temperature of the compressed air prior to combustion, achieves the desired effect. The recuperator reduces the amount of fuel required to reach the final combustion temperature. Thermodynamic cycle efficiency, and therefore fuel consumption, is directly proportional to the thermal effectiveness and pressure drop of the flow across the recuperator.

Various land-based small gas turbine engines for electricity generation and combined heat and power generation applications have been produced with recuperators, however, these technologies have not been widely integrated into general aviation, hybrid-electric power plants, or marine propulsion applications. While these technologies may perform well in separate test rigs in the case of land-based small gas turbine engines, they do not achieve the performance thermal efficiency, fuel consumption, endurance, reliability or stability when these components are scaled down and assembled into a complete engine.

In order to deliver a small scale or compact heat exchanger, it is envisaged that it will be a printed metal component, made through a process such as selective laser sintering (SLS) or selective laser melting (SLM). While compact recuperator designs may have been contemplated, a person skilled in the art will appreciate that many will not be achievable through traditional machining or fabrication processes, nor will they be printable due to effect of the high temperatures of the metal printing process and the layer by layer nature of the component structure.

It is against this background that the present disclosure has been developed.

SUMMARY OF THE INVENTION

According to a first aspect, there is provided a heat exchanger for a gas turbine engine comprising a compressor, a combustor and a turbine, the heat exchanger comprising a plurality of alternating hot and cold channels, through which compressed air from the compressor flows through the cold channels and exhaust gas from the turbine flows through the hot channels, wherein each cold channel is defined by a first cold surface and an opposing second cold surface, and arranged to convey the compressed air along a first path, wherein each cold channel comprises rows of cold vortex generators and cold pin fins extending from at least one of the first or second cold surfaces and arranged along the first path, such that the rows are arranged substantially perpendicular to the first path, wherein each hot channel is defined by a first hot surface and an opposing second hot surface, and arranged to convey the exhaust gas along a second path substantially perpendicular to that of the first path, and wherein each hot channel comprises rows of hot vortex generators and hot pin fins extending from at least one of the first or second hot surfaces and arranged along the second path, such that the rows are arranged substantially perpendicularly to the second path.

In one form, the cold vortex generators and cold pin fins are arranged in alternating rows along the first path.

In one form, the cold vortex generators span 50 to 75 percent of the distance between the first and second cold surfaces.

In one form, alternate rows of cold vortex generators extend from a first and second cold surface respectively.

In one form, the cold vortex generators are elongate plates that extend away from the surface they extend from toward the opposing surface.

In one form, the direction of elongation of the cold vortex generators is non-parallel and non-perpendicular with the first path.

In one form, the cold vortex generators extend away from the surface that they extend from at an angle of 45 degrees.

In one form, the cold pin fins span the entire distance between the first and second cold surfaces.

In one form, the cold pin fins have an hour glass shaped cross section across a plane perpendicular to the direction of the first path.

In one form, the cold pin fins have a tear drop shaped cross-section across a plane substantially parallel to the first or second cold surfaces.

In one form, the hot vortex generators and hot pin fins are arranged in alternating rows along the second path.

In one form, the hot vortex generators span 50 to 75 percent of the distance between the first and second hot surfaces.

In one form, alternating rows of hot vortex generators extend from a first and second hot surface respectively.

In one form, the hot vortex generators are elongate plates that extend away from the surface they extend from toward the opposing surface.

In one form, the direction of elongation of the hot vortex generators is non parallel and non-perpendicular with the second path.

In one form, the hot vortex generators extend away from the surface that they extend from at an angle of 45 degrees.

In one form, the hot pin fins span the entire distance between the first and second hot surfaces.

In one form, the hot pin fins have an hour glass shaped cross section across a plane perpendicular to the direction of the second path.

In one form, the hot pin fins are substantially planar.

In one form, the cold channel is a two pass channel.

In one form, the cold vortex generators and the hot vortex generators extend away from their respective surfaces in the same direction.

In one form, the cold vortex generators are arranged in adjacent pairs.

In one form, adjacent cold vortex generators are arranged at an angle to each other which diverges in the direction of the first path.

In one form, the hot vortex generators are arranged in adjacent pairs.

In one form, adjacent hot vortex generators are arranged at an angle to each other which diverges in the direction of the second path.

BRIEF DESCRIPTION OF THE DRAWINGS

Embodiments of the present invention will be discussed with reference to the accompanying drawings wherein.

DETAILED DESCRIPTION OF THE EMBODIMENTS

Figure 1:
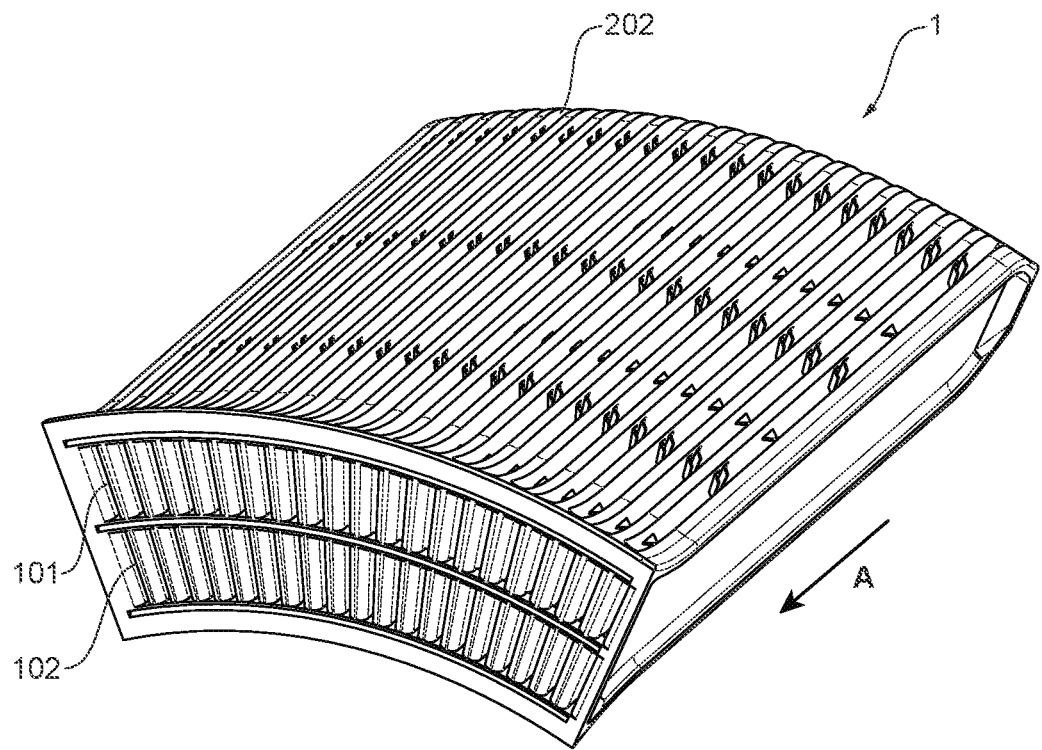
FIG. 1 is a perspective view of a heat exchanger module, according to an embodiment.
Figure 2:
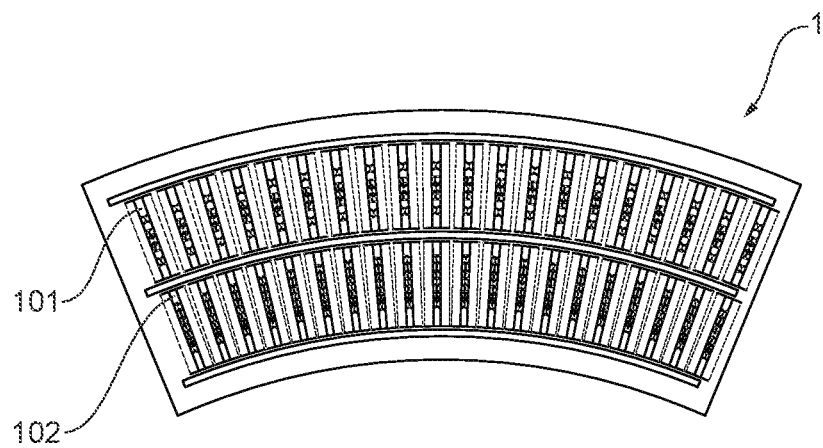
FIG. 2 is a front view of the heat exchanger module of FIG. 1.
Figure 3:
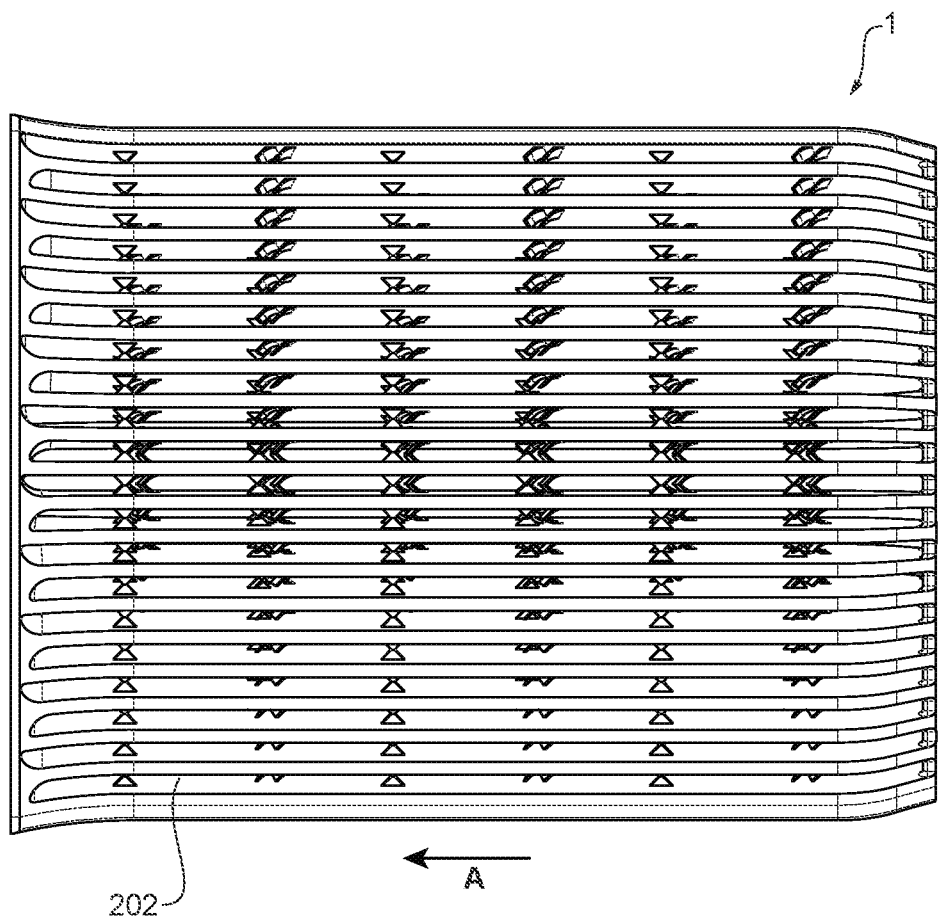
FIG. 3 is a top view of the heat exchanger module of FIG. 1.
Figure 4:
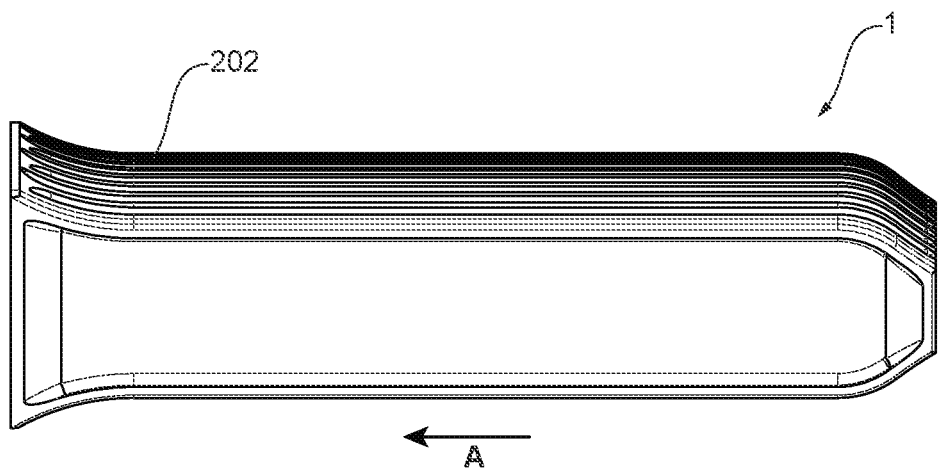
FIG. 4 is a side view of the heat exchanger module of FIG. 1.
Figure 5:
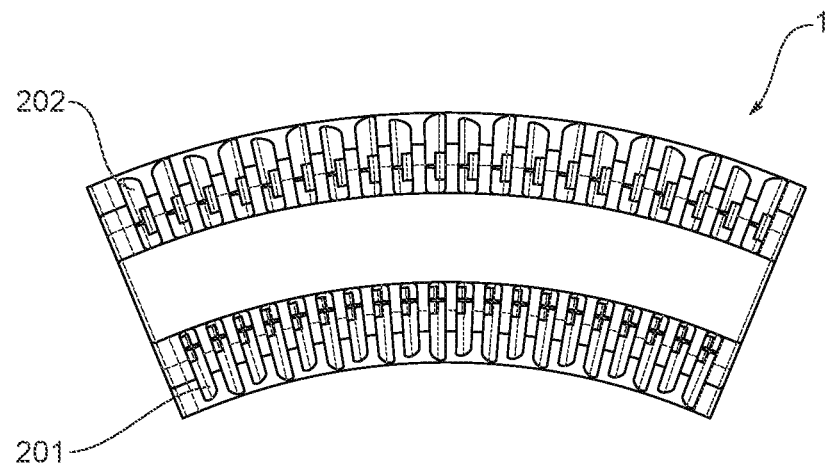
FIG. 5 is a rear view of the heat exchanger module of FIG. 1.

Referring now to FIGS. 1 to 6, there is shown a heat exchanger 1 for a gas turbine engine comprising a compressor, a combustor and a turbine. The heat exchanger 1 comprises a plurality of alternating cold and hot channels 100, 200, through which compressed air from the compressor flows through the cold channels 100 and exhaust gas from the turbine flows through the hot channels 200. Each cold channel 100 is defined by a first cold surface 103 and an opposing second cold surface 104, and is arranged to convey the compressed air along a first path. Each cold channel 100 comprises rows of cold vortex generators 110 and cold pin fins 120 arranged along the first path, such that the rows are arranged substantially perpendicular to the first path. Each hot channel 200 is defined by a first hot surface 203 and an opposing second hot surface 204, and is arranged to convey the exhaust gas along a second path substantially perpendicular to that of the first path. Each hot channel 200 comprises rows of hot vortex generators 210 and hot pin fins 220 along the second path, such that the rows are arranged substantially perpendicular to the second path.

In the embodiment shown and described, the heat exchanger 1 comprises a plurality of alternating cold and hot channels 100, 200, the first and second surfaces of the alternating hot and cold channels 100, 200 are arranged at angles to each other to form an arc, ultimately forming part of an annular heat exchanger. It will however be appreciated that in alternative embodiments, the alternating cold and hot channels may be arranged parallel to each other in a stacked arrangement.

In the embodiment shown and described, the cold channel 100 is a two pass type, i.e. the compressed air enters through a corresponding cold channel inlet 101, and makes two passes across the heat exchanger before exiting through the cold channel outlet 102. In this instance, the cold channel inlet 101 and cold channel outlet 102 are arranged adjacent to one another. It will be appreciated that in an alternative embodiment, the heat exchanger may comprise a single pass cold channel, or it may comprise a multi-pass cold channel.

Figure 6:
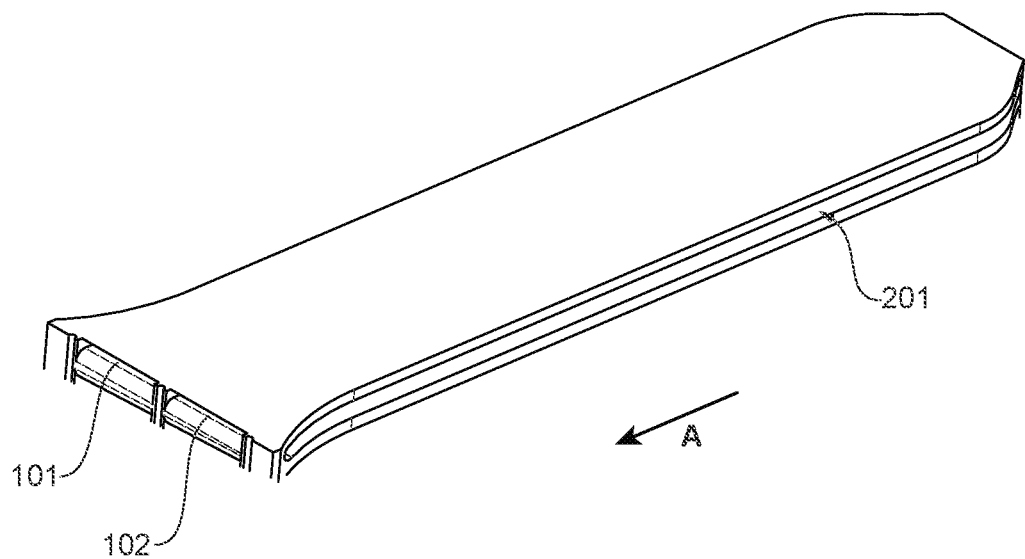
FIG. 6 is a perspective view of a single pair of adjacent hot and cold channels from the heat exchanger module of FIG. 1.
Figure 7:
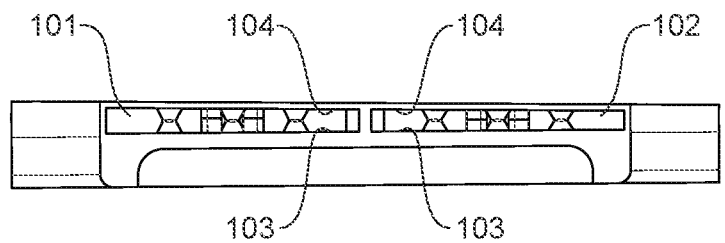
FIG. 7 is a front view of the single pair of adjacent hot and cold channels from the heat exchanger module of FIG. 1.
Figure 8:
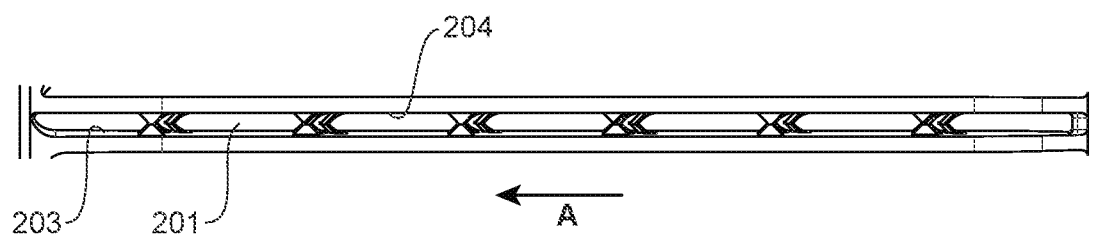
FIG. 8 is a side view of the single pair of adjacent hot and cold channels from the heat exchanger module of FIG. 1.

Referring now to FIGS. 6, 7 and 8, where a single pair of adjacent cold and hot channels 100, 200 are shown. As previously described, it can be seen that the first and second cold surfaces 103, 104 are arranged at an angle to each other (in this instance, at an angle of approximately 0.75 degrees to each other), and the first and second hot surfaces 203, 204 are also arranged at an angle to each other (in this instance, at an angle of approximately 1.5 degrees to each other). The hot channel separation is larger than the cold channel separation as a means to minimise the collective pressure drop penalty imposed on the system because of the recuperator. Such a relationship creates 260 pairs of adjacent hot and cold channels in a complete annular heat exchanger. It will however be appreciated that any divisor of 360 degrees will work similarly.

Referring now to FIGS. 9 to 12, where the cold channel 100 is shown in greater detail. As previously described, the cold channel 100 is a two pass type, where compressed air enters an inlet 101 and follows an axial flow path, turns 180 degrees through a 180 degree bend section 140 and exits the cold channel 100 axially through an outlet 102 adjacent to the inlet 101.

Figure 9:
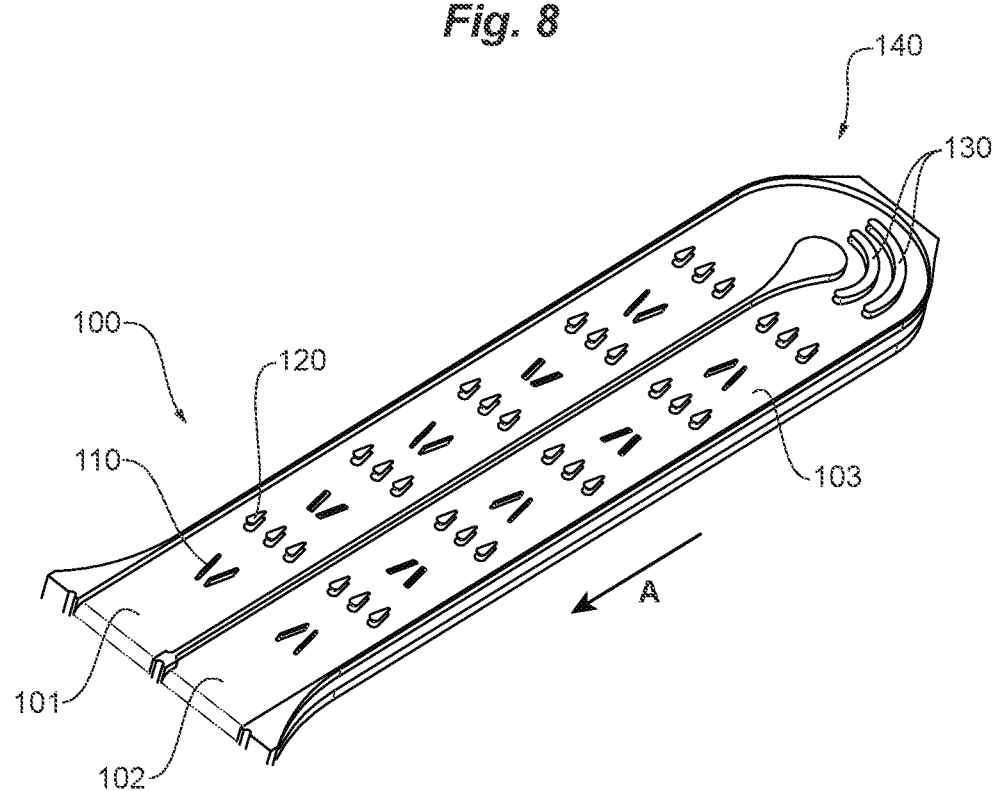
FIG. 9 is a sectional perspective view of the single pair of adjacent hot and cold channels from the heat exchanger module of FIG. 1, detailing the internal features of the cold channel.

As best shown in FIGS. 8 and 9, the cold vortex generators 110 and pin fins 120 are arranged in alternating rows along the first path, with the cold vortex generators 110 reconditioning the flow across the pin-fin 120 array before interacting with the next set of vortex generators 110.

The cold vortex generators 110 create large scale flow structures to promote boundary layer transition to turbulence and flow mixing for improved heat transfer. In the embodiment shown, the vortex generators 110 are arranged in pairs at an angle to one other which diverges in the direction of flow, enhancing vortex generation.

Figure 11:
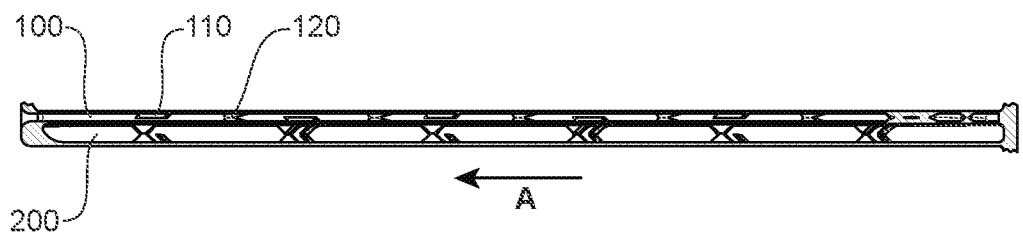
FIG. 11 is a sectional side view of the single pair of adjacent hot and cold channels from the heat exchanger module of FIG. 1, detailing the internal features of the cold channel.
Figure 12:
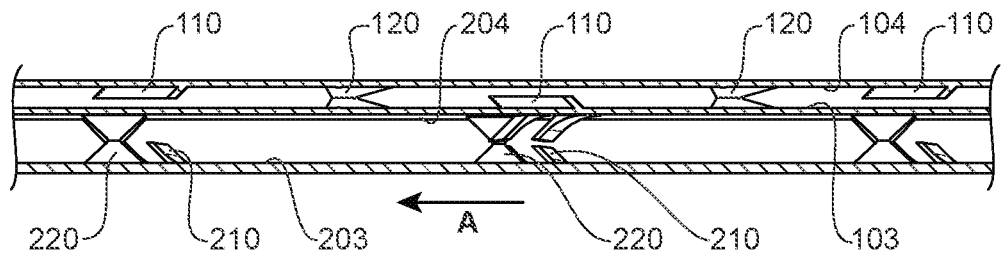
FIG. 12 is a detailed sectional side view of FIG. 11.

As best shown in FIGS. 11 and 12, the cold vortex generators span 50 to 75% of the cold channel 100 and generate voracity as the flow passes over. It can also be seen that alternate rows of the cold vortex generators 100 extend from first and second cold surfaces 103, 104 respectively.

Figure 10:
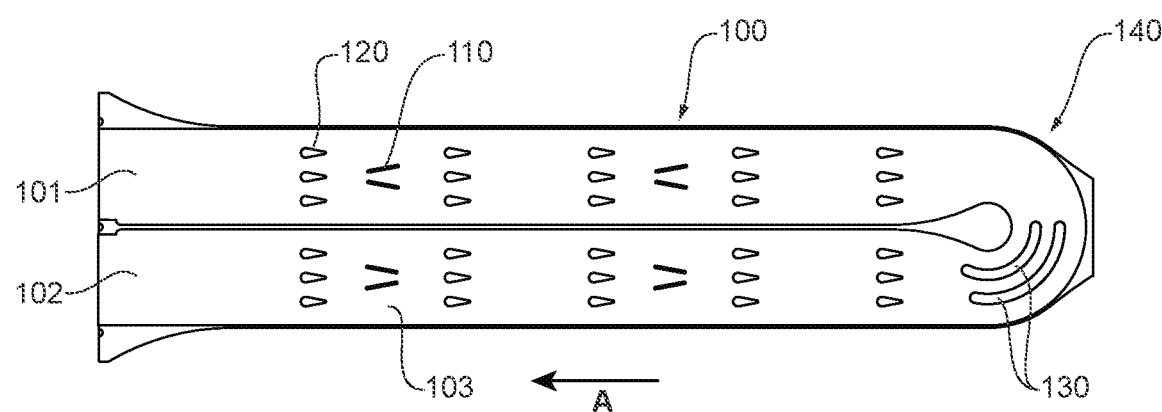
FIG. 10 is a sectional top view of the single pair of adjacent hot and cold channels from the heat exchanger module of FIG. 1, detailing the internal features of the cold channel.

The cold pin fins 120 span the entire cold channel 100 and provide structural rigidity to prevent or mitigate channel collapse. Their shape also induces vorticity and turbulence within the flow. As best shown in FIGS. 7 and 9, the cold pin fins 120 have an hour glass shaped cross section across a plane perpendicular to the direction of the first path, and as best shown in FIGS. 9 and 10, they feature a tear drop shaped cross-section across a plane substantially parallel to the first or second cold surfaces 103, 104. It will be appreciated that the hourglass shape of the cold pin fins 120 induces vorticity (which creates a better environment for heat transfer through the fluid) in a specific orientation, while the tear drop shape facilitates additive manufacturing.

The 180 degree bend section 140 features turning vanes 130 through the final 90 degrees of the bend to mitigate and/or prevent flow separation.

Figure 13:
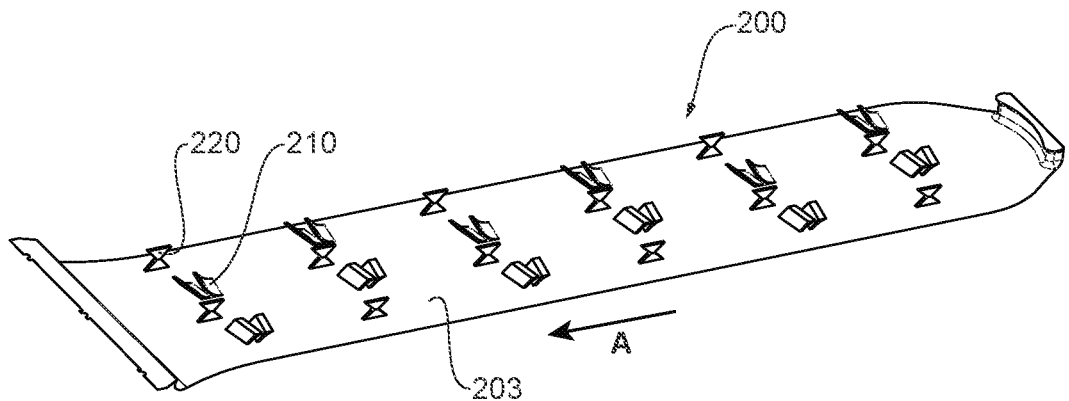
FIG. 13 is a sectional perspective view of the single pair of adjacent hot and cold channels from the heat exchanger module of FIG. 1, detailing the internal features of the hot channel.
Figure 14:
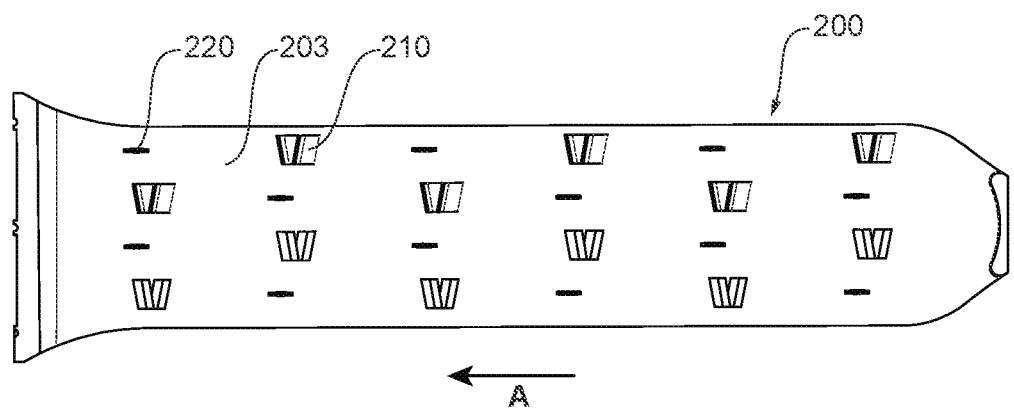
FIG. 14 is a sectional top view of the single pair of adjacent hot and cold channels from the heat exchanger module of FIG. 1, detailing the internal features of the hot channel.
Figure 15:
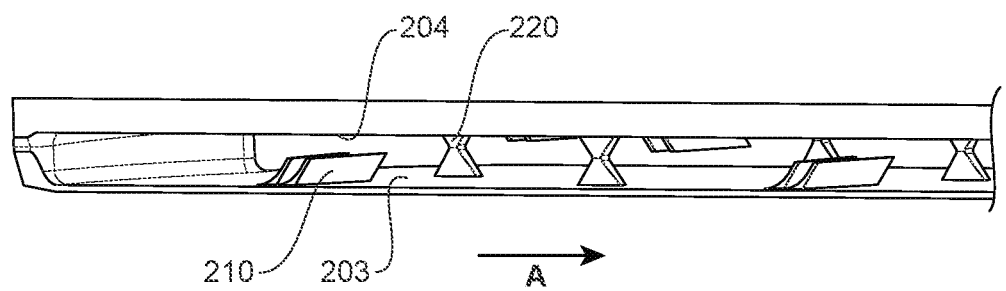
FIG. 15 is a detailed perspective view of the single pair of adjacent hot and cold channels from the heat exchanger module of FIG. 1, detailing the internal features of the hot channel.

Referring now to FIGS. 13 to 15, where the hot channel 200 is shown in greater detail. As previously described, the hot channel 200 is a single pass type, where exhaust gases enter the inlet 201 and follow a radial flow path substantially perpendicular to that of the first path before exiting the hot channel axially through an outlet 202 on the opposite side of the heat exchanger to the inlet 201.

The hot pin-fins 220 and vortex generators 210 are designed to increase turbulence within the hot channel 200, and therefore transfer heat from the hot exhaust gases to the compressed air in the cold channel 100.

Similarly to those in the cold channel 100, the hot vortex generators 210 span 50-75% of the distance between opposing surfaces 203, 204 and act to induce voracity and turbulence within the flow. Again, the surface of the channel from which they extend can be consistent or alternate between sets of vortex generators 210. The angled arrangement of the pairs enhances the vortex generation.

The hot pin-fins 220 are substantially planar, hourglass shaped features that span the entire hot channel 200 and provide vortex generation and structural rigidity just as the cold pin fins 120.

The hot and cold pin fins, the hot and cold vortex generators, and the turning vanes in the 180 degree bend have been designed with asymmetry to facilitate additive manufacturing.

To assist with this description, a printing direction arrow A, is shown in the Figures to indicate the "up orientation" of the heat exchanger 1 as it is printed layer by layer. It will be appreciated that the axial component of the first path is collinear with the print direction A and the second path is perpendicular to the print direction A.

As metal printing melts or sinters layer of powder at a very high temperatures, each layer of the heat exchanger 1 requires something solid to build upon, not just loose powder. While the walls defined by the cold and hot surfaces 103, 104, 203, 204 are aligned with the print direction "A" and therefore are self-supporting, if the vortex generators 110, 210 and pin fins 210, 220 were simply printed as symmetric components that extended perpendicularly from their respective surfaces that they depend from, it will be appreciated that they would be subject to deformation as they would not have something solid to build upon.

As can be seen, the cold vortex generators 120 do not extend perpendicularly from their respective surfaces 103, 104, instead they extend at an angle of approximately 45 degrees to the surface they depend from (and correspondingly the print direction A). This angle means as each vortex generator 110 is built up layer by layer, the layer below acts as the support for the layer above.

Similarly, the cold pin fins 120 have been designed with an asymmetric tear drop shape, with the tear drop tail extending at an angle of approximately 45 degrees to the surfaces that the cold pin fins depend from. Again, this angle means that as each pin fin 120 is built up layer by layer, the layer below acting as a support for the layer above.

It can also be seen that the turning vanes 130 are only printed in the second 90 degrees of the 180 degree bend 140 so that powder used in the additive manufacturing process can be easily removed from each cold channel 100 prior to stress relief. The turning vanes 130 are also printed with an hour-glass shaped cross section to facilitate additive manufacturing in regions that would otherwise have posed a fully unsupported extrusion in certain print orientations.

The hot pin-fins 220 and vortex generators 210 are also designed with asymmetry to facilitate additive manufacturing.

The hot vortex generators 210 have the same dimensions as the cold vortex generators 110 but their 45 degree angle of emergence from the channel surface is along their broad edge rather than their short edge. To further facilitate additive manufacturing, the hot vortex 210 generators also feature radiused fillets 211, further improving the self-supporting nature of each printed vortex generator 210.

It will also be appreciated that the hour glass shaped cross section of the hot pin fins 220 facilitates additive manufacturing, while continuing to produce a symmetric set of counter-rotating vortices. While in the embodiment shown the hot pin fins 220 appear planar, in alternative embodiments they could be rounded with tear-drop extensions extending from either side.

While in the embodiment shown the vortex generators extend from alternating surfaces, it will be appreciated that in alternate embodiments, all of the vortex generators may extend from the same surface. While the cold channel vortex generators and pin fins are shown arranged in alternating rows, it will be appreciated that in alternative embodiments, each row may comprise combinations of pin fins and vortex generators. Conversely, while the hot channel vortex generators and pin fins are shown in rows comprising combinations of pin fins and vortex generators, it will be appreciated that in alternative embodiments, each row may comprise alternating row of vortex generators and pin fins.

Furthermore, it will be appreciated that the angle between adjacent vortex generating plates, the distance between and the length thereof have a wide range of acceptable dimensions. These could be described quite generally as being a pair of plates between but not inclusive of parallel or perpendicular arrangement, of any length less than that of that of their respective channel.

The width of the vortex generating protrusions should be in a range of 1-5% of the total dimension of the channel in that same direction. The width being defined as the dimension of the protrusion parallel to the channel plate. The height of the protrusion shall be anywhere between 10-90% of the channel extending in the same direction. The height being defined as the dimension of the protrusion perpendicular to the channel plate where the vortex generator is rooted. The length of the vortex generator should be no less than twice the width, but no longer than 10% of the overall length of the channel. The angle between plate pairs shall be 0-60 degrees as a half-angle measurement from the flow direction. For instance, a symmetric offset from the centreline between the plates, 60 degrees would be equivalent to 120 degrees measured between the plates themselves. The distance between the plates may be defined as a range based on the length of the vortex generating plates, where the narrowest gap between the plates should be 25-75% of the length of the vortex generating plate. The number of vortex generating plates in the channel should range from 1 to as many as can fit while maintaining a balanced, symmetrical arrangement within the channel.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

What is claimed as new and desired to be secured by Letters Patent is:

1. A heat exchanger for a gas turbine engine comprising a compressor, a combustor and a turbine, the heat exchanger comprising a plurality of alternating hot and cold channels, through which compressed air from the compressor flows through the cold channels and exhaust gas from the turbine flows through the hot channels,
   wherein each cold channel is defined by a first cold surface and an opposing second cold surface, and arranged to convey the compressed air along a first path;
   wherein each cold channel comprises rows of cold vortex generators and cold pin fins extending from at least one of the first or second cold surfaces and arranged along the first path, such that the rows are arranged substantially perpendicular to the first path;
   wherein each hot channel is defined by a first hot surface and an opposing second hot surface, and arranged to convey the exhaust gas along a second path substantially perpendicular to that of the first path; and
   wherein each hot channel comprises rows of hot vortex generators and hot pin fins extending from at least one of the first or second hot surfaces and arranged along the second path, such that the rows are arranged substantially perpendicularly to the second path;
   wherein the cold pin fins span an entire distance between the first and second cold surfaces;
   wherein the cold pin fins have an hour glass shaped cross section across a plane perpendicular to a direction of the first path; and
   wherein the cold pin fins have a tear drop shaped cross-section across a plane substantially parallel to the first or second cold surfaces.

2. The heat exchanger as claimed in claim 1, wherein the cold vortex generators and cold pin fins are arranged in alternating rows along the first path.

3. The heat exchanger as claimed in claim 1, wherein the cold vortex generators span 50 to 75 percent of a distance between the first and second cold surfaces.

4. The heat exchanger as claimed in claim 3, wherein alternate rows of cold vortex generators extend from a first and second cold surface respectively.

5. The heat exchanger as claimed in claim 1, wherein the cold vortex generators are elongate plates that extend away from the surface they extend from toward the opposing surface.

6. The heat exchanger as claimed in claim 5, wherein a direction of elongation of the cold vortex generators is non parallel and non-perpendicular with the first path.

7. The heat exchanger as claimed in claim 1, wherein the cold vortex generators extend away from the surface that they extend from at an angle of 45 degrees.

8. The heat exchanger as claimed in claim 1, wherein the hot vortex generators and hot pin fins are arranged in alternating rows along the second path.

9. The heat exchanger as claimed in claim 8, wherein the hot vortex generators span 50 to 75 percent of a distance between the first and second hot surfaces.

10. The heat exchanger as claimed in claim 9, wherein alternating rows of hot vortex generators extend from a first and second hot surface respectively.

11. The heat exchanger as claimed in claim 1, wherein the hot vortex generators are elongate plates that extend away from the surface they extend from toward the opposing surface.

12. The heat exchanger as claimed in claim 11, wherein a direction of elongation of the hot vortex generators is non-parallel and non-perpendicular with the second path.

13. The heat exchanger as claimed in claim 1, wherein the hot vortex generators extend away from the surface that they extend from at an angle of 45 degrees.

14. The heat exchanger as claimed in claim 1, wherein the hot pin fins span an entire distance between the first and second hot surfaces.

15. The heat exchanger as claimed in claim 14, wherein the hot pin fins have an hour glass shaped cross section across a plane perpendicular to a direction of the second path.

16. The heat exchanger as claimed in claim 1, wherein the hot pin fins are substantially planar.

17. The heat exchanger as claimed in claim 1, wherein the cold channel is a two pass channel.

18. The heat exchanger as claimed in claim 1, wherein the cold vortex generators and the hot vortex generators extend away from their respective surfaces in a same direction.

19. The heat exchanger as claimed in claim 1, wherein the cold vortex generators are arranged in adjacent pairs.

20. The heat exchanger as claimed in claim 19, wherein adjacent cold vortex generators are arranged at an angle to each other which diverges in a direction of the first path.

21. The heat exchanger as claimed in claim 1, wherein the hot vortex generators are arranged in adjacent pairs.

22. The heat exchanger as claimed in claim 21, wherein adjacent hot vortex generators are arranged at an angle to each other which diverges in a direction of the second path.

\* \* \* \* \*